Sept. 28, 1926.  
C. K. CARTER  
MOTOR DRIVEN WOODWORKING TOOL  
Filed August 20, 1924   4 Sheets-Sheet 3
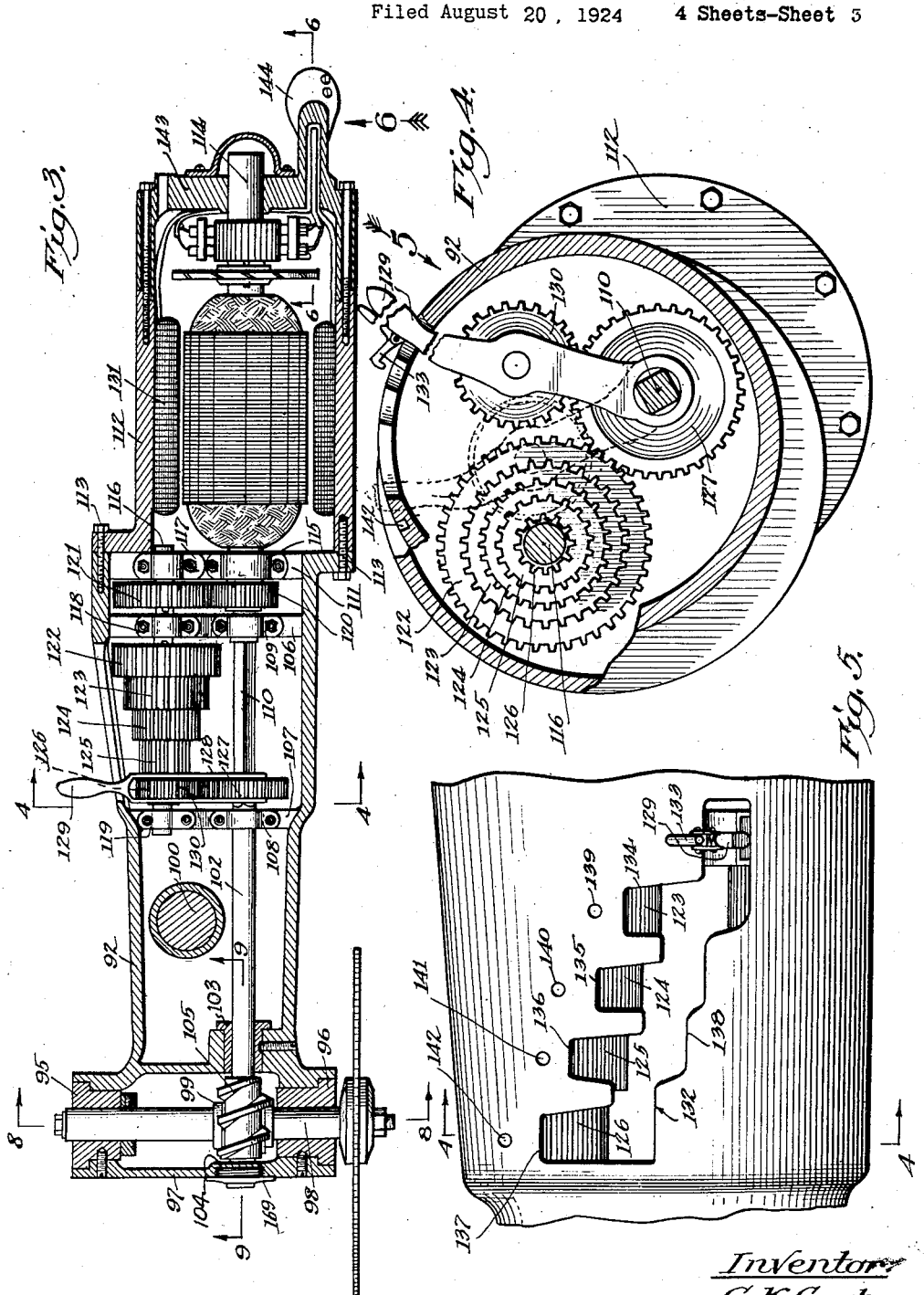

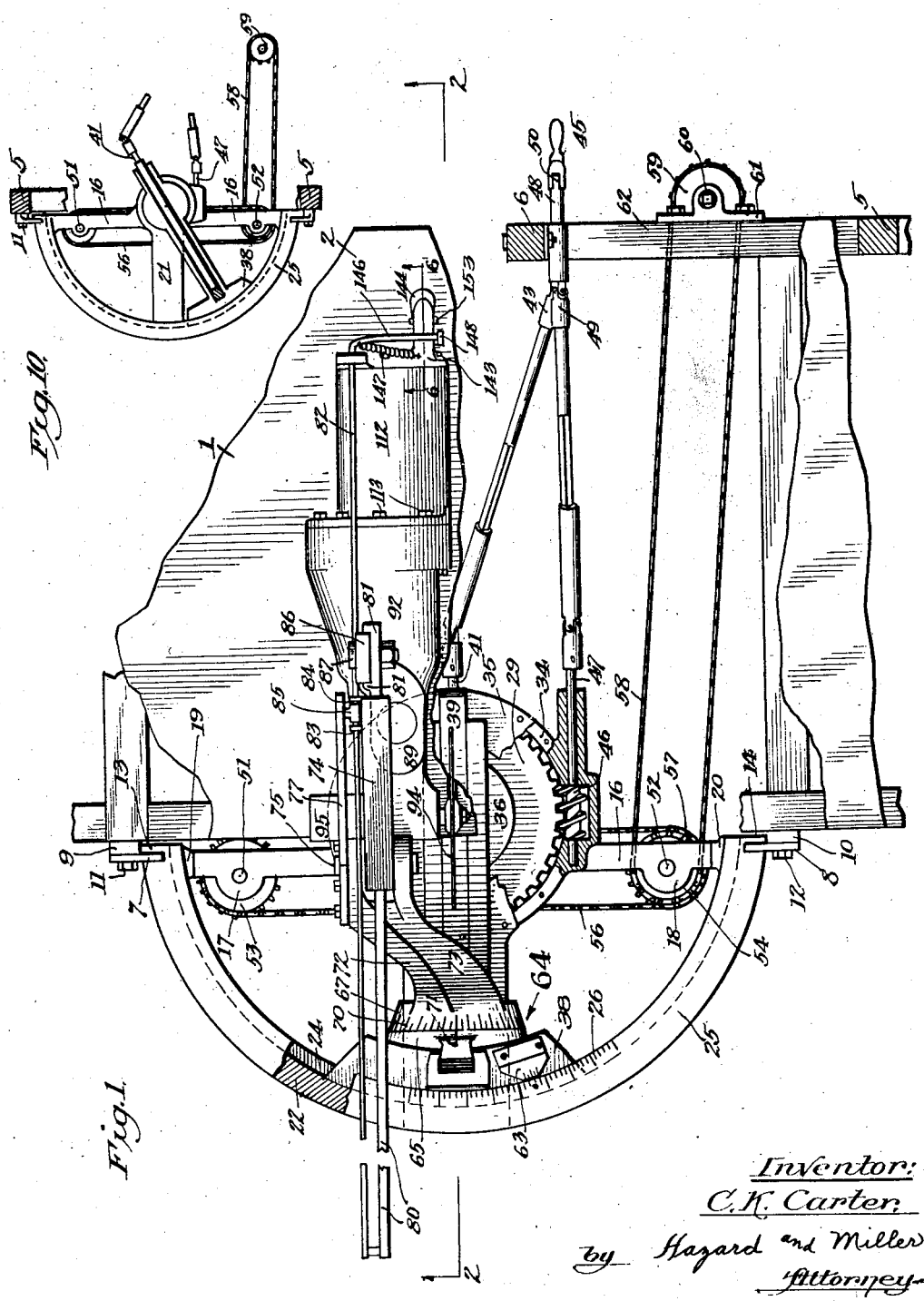

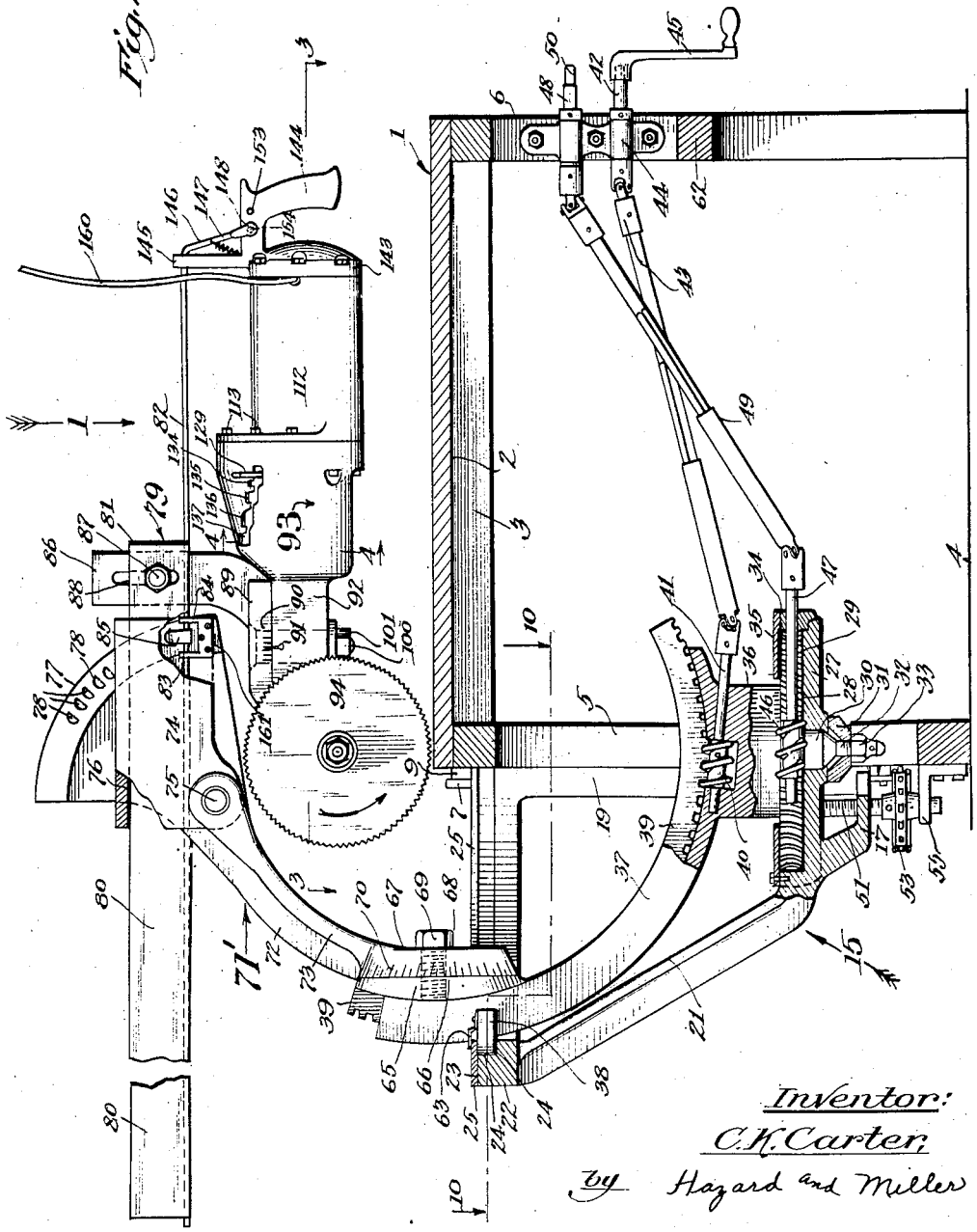

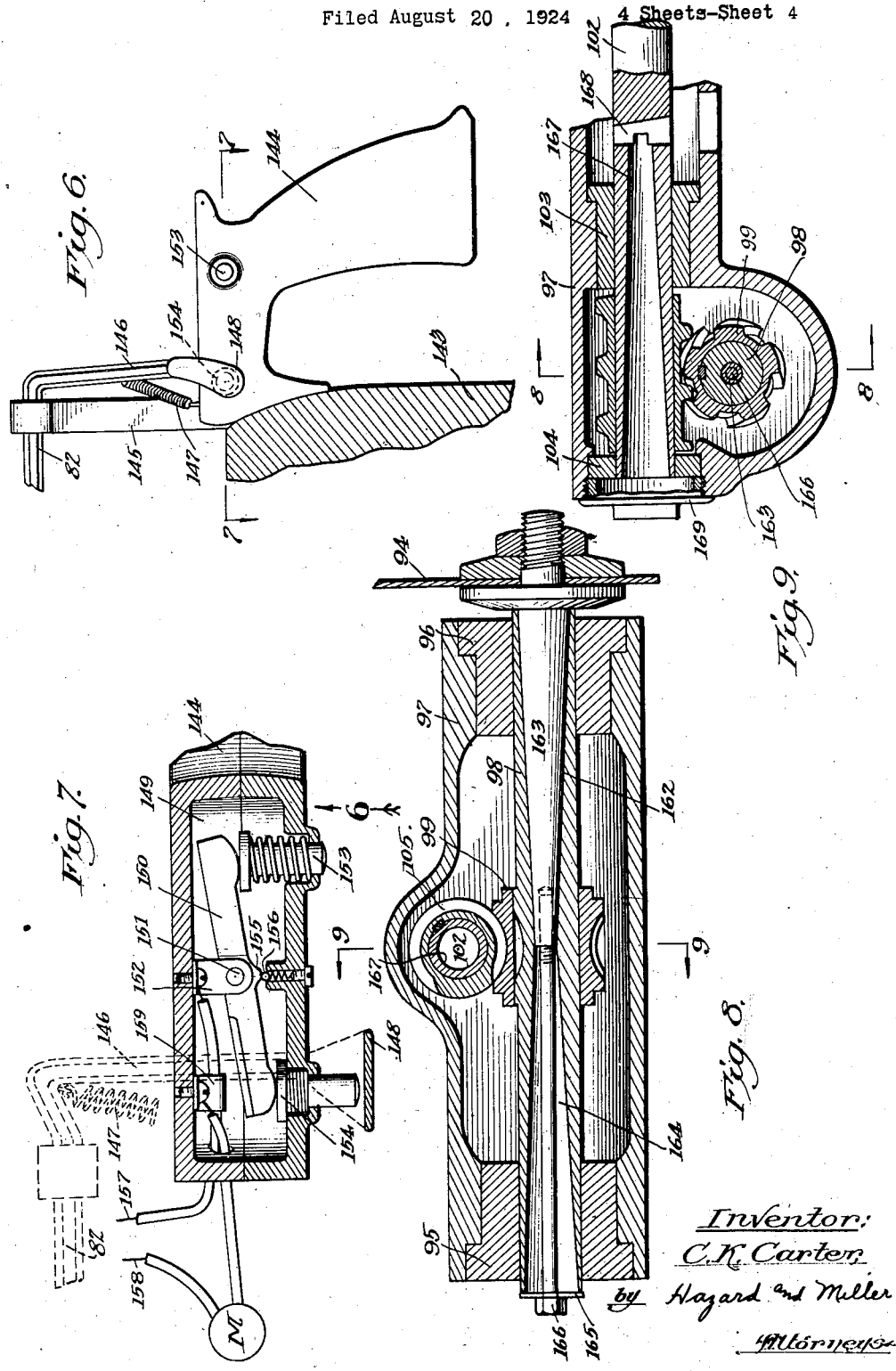

Patented Sept. 28, 1926.

1,601,610

UNITED STATES PATENT OFFICE.

CHARLES K. CARTER, OF LOS ANGELES, CALIFORNIA.

MOTOR-DRIVEN WOODWORKING TOOL.

Application filed August 20, 1924. Serial No. 733,130.

This invention relates to motor driven wood working tools such as circular saws, drills, and the like, and consists of the novel features herein shown, described and claimed.

An object is to make a motor driven tool such as a circular saw in which the tool moves to the work and which may be operated at various desirable angles.

Another object is to make a circular saw construction which may be readily moved or adjusted up and down relative to a saw table.

Another object is to make a circular saw construction in which the saw may be tilted longitudinally of its axis to cut bevels and the like.

Another object is to make a circular saw construction in which the motor is direct connected to and moves with the saw construction.

A further object of my invention is to pass a circular saw by thrusting or pulling over a table on which work may be placed or secured, the saw always centering to the same point or place relative to the table.

In accomplishing the above objects I mount a circular saw above a table so that the saw may be turned at various horizontal angles with the axis of the saw parallel to the table, also the saw is mounted so that it may tilt with the axis inclined to the table so as to cut bevels, or a third swivelling adjustment may be made so that the saw may travel in an inclined path in reference to the table with its axis either parallel to the table or inclined thereto. Thus the various manners of swivelling the saw may be combined or utilized singly.

Another feature of my invention is mounting the saw and the various points of swivelling so that the cutting edge of the saw always centers at the axial center of all the swivelling points, that is, the saw may also be returned or start from the center on which the various angles are formed.

Other objects and advantages will appear from the drawings and specification.

The drawings illustrate the construction and operation of a motor driven wood working tool embodying the principles of my invention.

Figure 1 is a fragmentary top plan view of the wood working tool as seen looking in the direction indicated by the arrow 1 in Fig. 2.

Fig. 2 is a vertical sectional detail on the line 2—2 of Fig. 1 and looking in the direction indicated by the arrows.

Fig. 3 is an enlarged horizontal sectional detail on the line 3—3 of Fig. 2 and looking downwardly as indicated by the arrows.

Fig. 4 is a vertical longitudinal cross section upon an enlarged scale and taken on the line 4—4 of Fig. 3 and looking in the direction indicated by the arrows.

Fig. 5 is a fragmentary elevation looking in the direction indicated by the arrow 5 in Fig. 4.

Fig. 6 is an enlarged fragmentary view partly in elevation and partly in section, the elevation being taken looking in the direction indicated by the arrow 6 in Fig. 3.

Fig. 7 is a horizontal sectional detail on the line 7—7 of Fig. 6.

Fig. 8 is an enlarged sectional detail on the lines 8—8 of Figs. 3 and 9.

Fig. 9 is a fragmentary longitudinal sectional detail on the lines 9—9 of Figs. 3 and 8.

Fig. 10 is a horizontal section on a reduced scale and taken on the line 10—10 of Fig. 2 and looking downwardly as indicated by the arrows.

The details of construction and operation shown in the drawings are as follows:

The details of the rigid saw table 1 are as follows:

The table top 2 is rigidly constructed and rectangular in plan and is securely mounted upon a supporting frame 3 held elevated from a floor 4 by vertical posts 5. An intermediate vertical front post 6 is inserted into the frame to support parts of the adjusting mechanism. Plates 7 and 8 are spaced from the back side of the frame by blocks 9 and 10 and securely held in position by bolts 11 and 12, the plates being vertical and in parallel plane and projecting toward each other to form slide ways 13 and 14.

The details of the vertical slide 15 for adjusting the saw up and down are as follows:

A cross bar 16 has vertical screw threaded bearings 17 and 18 at its ends and posts 19 and 20 extending upwardly from its ends outside of the bearings 17 and 18. A third post 21 extends upwardly and backwardly half way between the posts 19 and 20 and a guide bar 22 connects the upper ends of the posts 19 and 20, the guide bar 22 extending through nearly a half circle. The upper face 23 of the guide bar 22 is finished and in a plane parallel with the upper face of the table top 2 and an angular groove is formed from the upper face and inwardly to produce part of a slide way 24. A plate 25 fits upon the face 23 and overlaps the groove and completes the slide way 24. A scale 26 is formed upon the upper face of the plate 25 for assistance in adjusting the saw to cut various angles.

A bearing block 27 extends inwardly from near the lower end of the post 21, the upper face 28 of the bearing block 27 being flat and level. A worm gear 29 fits upon the upper face 28 and has a stem 30 extending downwardly through the plate 27 and forming a bearing. A reducing washer 31 fits against the block 27 and a stud 32 extends through the washer 31 and is held in place by a nut 33. A rim 34 extends upwardly from the block 27 around the gear 29 and a plate 35 is secured to the rim 34 and overlaps the gear 29. A pedestal 36 extends upwardly from the gear 29 through the plate 35. An arcuate channeled arm 37 extends from the top of the pedestal 36 and has a bearing lug 38 fitting in the slide way 24. A gear rack 39 fits in the channel of the arm 37. A worm 40 is mounted in a recess at the top of the pedestal 36 and meshes with the rack 39. The stem 41 of the worm 40 is connected to a crank shaft 42 by a tumbling rod and universal joint construction 43 and the crank shaft 42 is mounted in a bearing 44 fixed upon the post 6. A removable crank 45 is adapted to be applied to the squared end of the crank shaft 42 so that by manipulating the crank 45 the rack 39 may be moved one way or the other.

A worm 46 meshes with the worm gear 29 and a stem 47 of the worm 46 is connected to a crank shaft 48 by a tumbling rod and universal joint construction 49 and the crank shaft 48 has a squared end 50 to receive the crank 45 so that by rotating the crank 45 the rack 39 may be swung in a horizontal plane upon the axis of the stem 30 and during this operation the bearing lug 38 moved in the slide way 24.

Screws 51 and 52 operate through the screw bearings 17 and 18. Sprocket wheels 53 and 54 are fixed upon the lower ends of the screws 51 and 52 and the screws are supported in bearings 55 secured to the rigid saw table frame 1. A sprocket chain 56 connects the sprockets 53 and 54. A third sprocket wheel 57 is fixed upon the screw 52 adjacent the sprocket wheel 54 and a chain 58 connects the third sprocket wheel 57 to a fourth sprocket wheel 59, and the spindle 60 of the sprocket wheel 59 is mounted in a bearing block 61 secured to the inserted horizontal post 62 and one end of the spindle 60 is squared to receive the crank 45 so that by applying and operating the crank 45 the screws 51 and 52 may be operated to raise or lower the slide 15.

An indicator 63 is secured to the guide lug 38 and extends upwardly and backwardly to co-operate with the scale 26 for setting the saw to cut at a desired angle.

The details of the mechanism 64 for tilting the saw longitudinally of its axis for cutting bevels and the like, are as follows:

A block 65 is formed integral with the upper rear end of the rack 39 and has a flat front face 66. A second block 67 has a flat face 68 fitting the face 66 and a bolt 69 is inserted through the block 67 and tapped into the block 65 so that when the bolt 69 is loosened the block 67 may be rotated upon the bolt and when the bolt is tightened the blocks 65 and 67 are held rigidly together. A scale 70 is formed upon the perimeter of the block 67 and a mark 71 is formed upon the upper end of the rack 39, so that by reading the scale 70 with relation to the mark 71 the saw may be tilted exactly to the desired angle.

The details of the mechanism 71' in which the saw supporting mechanism slides are as follows:

Arms 72 and 73 are formed integral with the block 67 and extend upwardly and forwardly. The box 74 fits loosely between the upper forward ends of the arms 72 and 73 and a pivot 75 is inserted through the arms 72 and 73 and the box 74 so that the box may rock upon the pivot in a vertical plane. A straight rectangular opening 76 is formed through the box from end to end A sector 77 is attached to the arm 72 and extends upwardly and forwardly in a plane parallel with the box 74. A series of openings 78 is formed through the sector 77 in the arc of a circle concentric to the pivot 75.

The details of the sliding mechanism 79 for carrying the saw are as follows:

The rectangular bar 80 of considerable length is mounted to slide in the opening 76 and has vertical parallel ribs 81 at its forward end. A hexagonal shaft 82 is mounted to slide through bearings 83 and 84 in a plane parallel with the box 74 and between the box 74 and the sector 77. A hook 85 is mounted between the bearings 83 and 84 upon the shaft 82 and the shaft 82 slides freely through the hook and the hook is adapted to engage in any desired one of the openings 78 so as to hold the box 74 at any desired angle. A shank 86 fits between the ribs 81 against the bar 80 and is held rigidly in place by a bolt 87, there being a slot 88 in the shank and through which the bolt 87 extends so that the shank may be adjusted vertically. A head 89 is formed upon the lower end of the shank 86 in a horizontal plane and has graduations 90 which may be read in connection with an indicator mark 91 upon the transmission case 92.

The details of the transmission mechanism 93 for operating the circular saw 94 are as follows:

Horizontally alined bearings 95 and 96 are mounted in a transversely extending shell 97 formed integral with the transmission case 92. The saw arbor 98 is mounted in the bearings 95 and 96 and the saw 94 is fixed upon one end of the arbor 98. A worm gear 99 is fixed upon the arbor 98 between the bearings 95 and 96. The head 89 fits against a flat top forming a part of the casing 92 and a bolt 100 extends through the head 89 and through the casing and has a nut 101 upon one end so that by loosening the nut 101 the casing 92 may be accurately adjusted by reading the scale 90 with reference to the indicator 91. The driven shaft 102 is mounted through bearings 103 and 104 above and crosswise of the arbor 98 and a worm 105 is fixed upon the shaft 102 in mesh with the worm gear 99. Bridges 106 and 107 are mounted transversely of the forward half of the casing 92 and the shaft 102 extends through bearings 108 and 109, the portion 110 of the shaft between the bearings 108 and 109 being squared.

A third bridge 111 is mounted in the extreme forward end of the casing 92. A motor casing 112 is secured to the ends of the transmission casing 92 by cap screws 113 and the motor shaft 114 extends through the bearing 115. A speed change counter-shaft 116 is mounted in a bearing 117 upon the bridge 111 and extends through a bearing 118 upon the bridge 106 and through a bearing 119 upon the bridge 107. A pinion 120 is fixed upon the motor shaft 114 between the bearings 109 and 115 and meshes with a gear 121 fixed upon the counter-shaft 116. Speed change gears 122, 123, 124, 125 and 126 are rigidly fixed upon the shaft 116 between the bearings 118 and 119. The shifting gear 127 is slidingly mounted upon the squared portion 110 of the driven shaft 102 and is mounted in a frame 128 having a handle 129 for shifting the gear. An idler gear 130 is mounted upon a spindle extending through the frame 128 and meshes with the sliding gear 127 so that when the idler 130 is in mesh with one of the gears 123, 124, 125 or 126 the driven shaft 102 is connected to be driven by the motor 131 upon the motor shaft 114.

The casing 92 has a zigzag opening 132 through which the handle 129 operates and the handle carries a locking dog 133. At one side of the slot 132 there are notches 134, 135, 136 and 137 in line with the gears 123, 124, 125 and 126 respectively, and when the handle 129 and latch 133 is operated and swung out of a notch and moved laterally along the line 138 and pressed into the notch 137 the idler 130 will mesh with the gear 126 and drive the driven shaft 102 at a comparatively slow speed. A series of openings 139, 140, 141 and 142 are formed opposite the notches 134, 135, 136 and 137 so that when the handle is swung into the notch 137 for instance, the latch 133 will engage in the opening 142 and hold the gears in mesh. If it is desired to increase the speed the latch 133 and handle 129 are operated and moved out of the notch 137 and into either one of the notches 134, 135 or 136. The gears are so proportioned that when the gear 127 is moved into the plane of the gear 122 the two gears will mesh and the idler 130 will be out of use and then the direction of rotation of the driven shaft 102 will be reversed.

A special head 143 is formed for the motor casing 112 and a pistol grip handle 144 is formed integral with the head 143. A bearing 145 extends upwardly from the head 143 and the shaft 82 extends through the bearing 145 and is bent downwardly to from a crank arm 146. A spring 147 is connected to the crank arm 146 and to the bottom of the bearing 145, the tension of the spring being exerted to hold the hook 85 in the desired opening 78. A button 148 extends to one side of the upper end of the pistol grip handle. A chamber 149 is formed in the upper part of the handle 144. A snap switch lever 150 is mounted in the chamber and has a pivot 151 extending through the center of the switch and through a bracket 152. The spring pressed push buttons 153 and 154 extend into and out of the chamber 149, one at each end of the switch 150. A right angled projection 155 extends from the center of the switch 150 and engages a spring pressed ball 156 as required to produce a snap action for quickly opening or quickly closing the circuit.

The conductor 157 is connected to the bracket 152 and a conductor 158 is connected to a second bracket 159 so that when the push button 154 is pressed inwardly the circuit is closed through the bracket 152, through the switch 150 and the bracket 159, and when the button 153 is moved inwardly the circuit is broken. The motor is operated through a lamp cord 160, one branch of the cord constituting the conductors 157 and 158.

The parts are so arranged that the hook 85 is normally in engagement with the sector 77 and in one of the openings 78 and the spring 147 pulling on the crank 146 holds the hook in this normal position with the button 148 away from the button 154 and the circuit opened. If it is desired to swing the motor upwardly out of the way, the button 148 is pressed to move the hook 85 out of engagement with the sector 77 and then the motor is manually lifted, the whole mechanism turning upon the pivot 75, and then the button 148 is released and the hook will engage the upper one of the openings 78 and hold the saw mechanism elevated so that the front part of the table is clear. In order to stop the saw the button 153 must be pushed inwardly and when it is desired to work the saw again the button 148 is pressed inwardly to release the hook 85 and at the same time press the button 154 inwardly to close the circuit and start the saw, and by the time the motor is moved downwardly into working position the saw will be under speed.

A lug 161 extends from the lower forward end of the sector 77 and under the forward end of the box 74 so that when the motor swings downwardly to normal position the lug 161 will serve to prevent the motor from swinging below normal position.

The arbor 98 has a regular Morse taper bore 162 in which the shank 163 is mounted and the saw 94 is mounted upon the outer end of the shank in the usual way. A buffing wheel, a grinder, a polisher, or the like, may be mounted in place of the saw. The arbor 98 has a tapered bore 164 extending from the opposite end from the saw, a washer 165 fits against the end of the arbor, and a bolt 166 extends through the washer and is tapped into the inner end of the shank 163 to hold the shank securely in place.

The rear end of the driven shaft 102 has a Morse tapered bore 167 extending from its rear end and a tapered knockout slot 168 crosswise of the front end of the bore 167. A plug 169 is screwed into the frame to cover the bearing 104 and the shaft 102. When desired, the plug 169 may be removed and a taper shank drill, reamer, or the like, may be inserted into the bore 167.

In the practical operation, the parts will all be adjusted as shown in Fig. 2 so that the saw 94 will pass close above the upper face of the table top 2 and the handle 144 will be manipulated to move the saw to the back side of the table top. Work will be placed upon the table top and held, the motor will be started and the saw pulled forwardly.

If it is desired to cut at an angle instead of straight across the table top, the crank 45 will be placed upon the shaft 48 and manipulated to rotate the entire mechanism upon the pivot 30 until the indicator 63 registers with the desired mark upon the scale 26. Then as the saw is drawn forwardly it will travel at an angle across the table top.

If it is desired to cut a bevel, the bolt 69 is loosened and the mechanism 71' is turned one way or the other until the scale 70 registers properly with the mark 71 and the bolt tightened and the saw operated as before.

If it is desired to raise the saw above the table top, the crank 45 is applied to the spindle 60 and operated until the desired height is reached.

If it is desired to make an inclined cut, the crank 45 is applied to the shaft 42 and manipulated to move the rack 39 one way or the other until the desired angle is reached.

If it is desired to use a drill or the like, the saw 94 is removed and the shank of the desired tool is inserted into the bore 167 and the mechanism pulled forwardly and the work placed upon the table behind the mechanism so that the boring or other work is performed by pushing backwardly on the handle 144.

It will be noted, referring particularly to Figs. 1 and 2, that the lower cutting edge of the saw is in axial alinement with the center on which the saw may be turned to cut different horizontal angles by positioning the bearing lug 38 on the arcuate plate 25. The cutting edge of the saw is also in axial alinement with the bolt 69 on which the arm 72 may be turned to tilt the axis of the saw in reference to the table. Moreover, the cutting edge of the saw is at the axial center of the arcuate channel arm 37 for swivelling the saw and its supporting elements to form an inclined cut with the axis of the saw parallel or inclined to the table.

Thus, in making anyone or more of the designated type of cuts such as the horizontal angle cuts, the tilting cuts for forming bevels on the inclined path of the saw, the cutting edge always centers in the same place in reference to the table no matter whether these cuts are made singly or the various swivel angles are turned to combine such types of cuts.

In some classes of work it is not necessary that the saw always be brought to this center on one part of a stroke, but nevertheless no matter what position the saw is placed in, it centers as above mentioned. In other words the cutting edge of the saw may be raised as at the complete end of a stroke, substantially in the position shown in Fig. 2, as being at the center of a sphere, such center forming that on which the various angles are turned as above described.

Applicant disclaims being the inventor of woodworking tools giving saw cuts in which the cuts can be arranged at different horizontal angles relative to each other or be inclined or tilted each cut in relation to the other. But applicant does claim to be the inventor of a machine by which the saw supporting mounting, carriage or the like, may be mounted solely at one side of the table on which the work is placed and will always cut so that its cutting edge may always center at the same position or center point relative to the table and to the supporting structure. These cuts may thus be made independent of whether the cuts are horizontal with the axis of the saw parallel to the table or inclined with the axis of the saw parallel to the table or tilted with the axis of the saw tilted to the table.

Various changes may be made without departing from the spirit of the invention as claimed.

I claim:

1. A woodworking tool having a supporting structure, a box mounted thereon having an opening therethrough, a bar slidable through the said opening, a motor casing with a motor therein, operatively connected to the bar, a saw operatively connected to the motor casing and driven by the motor, a sector on the supporting structure having a series of openings therein, a pivot pin connecting the said box to the supporting structure and a hook on the box operatively engaging the said opening in the sector, whereby the saw may be swivelled out of operative position.

2. A woodworking tool having a supporting structure, a box mounted thereon having an opening therethrough, a bar slidable through the said opening, a motor casing with a motor therein, operatively connected to the bar, a saw operatively connected to the motor casing and driven by the motor, a sector on the supporting structure having a series of openings therein, a pivot pin connecting the said box to the supporting structure and a hook on the box operatively engaging the said openings in the sector, whereby the saw may be swivelled out of operative position, a hexagonal shaft mounted parallel to the bar and engaging the said hook, and a pistol grip handle connected to the motor casing having push buttons and a lever mechanism therein to partially rotate the hexagonal bar to operate the said hook.

3. A woodworking tool having a supporting structure, a box mounted thereon having an opening therethrough, a bar slidable through the said opening a motor casing with a motor therein, operatively connected to the bar, a saw operatively connected to the motor casing and driven by the motor, a sector on the supporting structure having a series of openings therein, a pivot pin connecting the said box to the supporting structure, a hook on the box operatively engaging the said openings in the sector, whereby the saw may be swivelled out of operative position, a hexagonal shaft mounted parallel to the bar and engaging the said hook, a pistol grip handle connected to the motor casing having push buttons and a lever mechanism therein to partially rotate the hexagonal bar to operate the said hook, said pistol grip containing also electric terminals connected to the motor, whereby the motor may be switched on and off in accordance with the swivelling movement of the saw away from the work.

4. A woodworking tool comprising in combination a table, a slide frame attached thereto, a bearing block forming part of the slide frame, a horizontally rotatable pedestal supported thereby, an arcuate arm connected to the pedestal, an arcuate rack gear mounted on the arm, a supporting structure connected to the arcuate rack gear and a bar slidable longitudinally in the said supporting structure, having a casing with a motor and a saw operatively connected thereto, means to turn the pedestal on a vertical axis to change the angle of cut of the saw and means to tilt the arcuate rack to tilt the saw.

5. A woodworking tool as claimed in claim 4, having in addition a pair of vertical screws supported from part of the table structure and engaging the said slide, an endless chain to turn said screws and means to operate the said chain to raise and lower the said slide.

6. A woodworking tool as claimed in claim 4, having in addition a pivot bolt connected to the arcuate rack and to the said supporting structure, said bolt being in a radial line from the arcuate rack whereby the bolt may be operated to tilt the saw relative to the table.

7. A woodworking tool comprising in combination a table having vertical posts, a slide connected to the posts, said slide having a pair of posts adjacent the face of the table and a third post extending away from the table, an arcuate slideway connecting the tops of the posts, a bearing block forming part of the slide at the base thereof, a rotatable pedestal having a gear thereon mounted in the bearing block, a vertical channel arcuate arm extending from the pedestal and having a sliding connection with the arcuate slideway, an arcuate rack positioned in the said arm, a saw supporting structure connected to the arcuate rack, a block having an opening therethrough pivotally connected to the supporting structure, a bar slidable longitudinally through the opening in the said block, a shank adjustably attached to said bar, a motor casing with a motor therein, a shell having an arbor therein, the said arbor being driven by the motor, a saw on the arbor and a hand grip device attached to the motor casing having means therein to electrically control the motor.

8. A woodworking tool as claimed in claim 7, having in addition a radial bolt connecting the arcuate rack and the said supporting structure, whereby the said structure may be tilted in relation to the said rack.

9. A woodworking tool as claimed in claim 7, having in addition a sector on the supporting structure having openings therein, a hook on the box to engage said openings and a hexagonal rod slidable with the said bar having a bent end adjacent the hand grip device, push buttons in said device, electrical circuits operated thereby and, a button to operate the hexagonal rod to engage or disengage a hook from said openings.

10. A woodworking tool as claimed in claim 7, having in addition a series of flexible shafts with gearing connected to the gear on the pedestal and to the arcuate rack whereby the saw may be turned to cut at an angle or tilted by operating said flexible shaft.

11. A woodworking tool as claimed in claim 7, having in addition a pair of vertical screws supported from the table posts and threaded into said slide, sprocket wheels on the screws, a sprocket chain gearing the screws together to operate in unison and means to drive one of the sprockets to raise and lower the said slide.

12. A woodworking tool comprising in combination a table adapted to support material to be worked, a rotary saw, a mounting pivotally connected to one side of the table only, to support the saw, said mounting allowing movement of the saw over the table in a plurality of various horizontal inclined and tilted directions in straight lines, said mounting permitting the saw to always cut in a straight line to the same center in all inclined and tilted cuts.

13. A woodworking tool comprising in combination a table adapted to support material to be worked, a rotary saw, a mounting to allow movement of the saw over the table in a plurality of different straight lines with the axis of the saw inclined to the table, the said mounting permitting the saw to always cut in straight lines to the same center.

14. A woodworking tool comprising in combination a table adapted to support material to be worked, a rotary saw, a mounting to allow movement of the saw over the table, with the axis of the saw parallel to the table and to move in a plurality of different straight paths at an inclination to the table, the said mounting permitting the saw to always cut in a straight line to the same center.

15. A woodworking tool comprising in combination a table adapted to support material to be worked, a rotary saw, a saw supporting structure pivotally connected to one side of the table only, extending above the table, slidable means between the saw and the saw supporting structure to allow a plurality of different reciprocating movements of the saw over the table, means to allow changing of the paths of the saw across the table to make cuts at a plurality of different horizontal angles one to the other, the said saw being mounted whereby one end of all the cuts may center at the same place relative to the table, and means to allow tilting of the saw by tilting its axis in a plurality of different tilts, the cutting edge of the saw centering at the same place relative to the table in all tilted cuts.

16. A woodworking tool comprising in combination a table adapted to support material to be worked, a rotary saw, a saw supporting structure pivotally connected to one side of the table only, extending above the table, slidable means between the saw and the saw supporting structure to allow a plurality of different reciprocating movements of the saw over the table, means to allow changing of the paths of the saw across the table to make cuts at a plurality of different horizontal angles one to the other, the said saw being mounted whereby one end of all the cuts may center at the same place relative to the table, and means to move the saw in a plurality of inclined paths with the axis parallel to the table, the cutting edge of the saw centering at the same place relative to the table in all inclined cuts.

17. A woodworking tool comprising in combination a table adapted to support material to be worked, a rotary saw, a saw supporting structure pivotally connected to one side of the table only, extending above the table, slidable means between the saw and the saw supporting structure to allow a plurality of different reciprocating movements of the saw over the table, means to allow changing of the paths of the saw across the table to make cuts at a plurality of different horizontal angles one to the other, the said saw being mounted whereby one end of all the cuts may center at the same place relative to the table, means to tilt the saw relative to the table in a plurality of different tilts, and also means to move the saw in a plurality of inclined paths, the cutting edge of the saw always centering at the same place relative to the table in all tilted and inclined cuts.

18. A woodworking tool comprising in combination a table, a horizontal arcuate guide bar mounted on one end of the table, a rotary saw, said bar being curved in substantially a semi-circle, a supporting structure for the saw having a bearing lug slidable on the said bar, means to shift said bearing lug to thereby shift the saw to cut at various horizontal angles, the cutting edge of the saw always centering at the center of the arcuate bar.

19. A woodworking tool as claimed in claim 18, in which the means to shift the bearing lug comprises a worm gear, an operative connection between the said gear and the bearing lug, a worm meshing with the worm gear, and a shaft connected to the worm extending through the table with means at the opposite end of the table from the arcuate guide bar to operate the said shaft and hence the worm gear.

20. A woodworking tool as claimed in claim 18, having in addition a bolt operatively connected to the bearing lug and means to shift the saw supporting structure on the said bolt to tilt the cutting edge of the saw.

21. A woodworking tool as claimed in claim 18, having in addition an arcuate rack, an operative connection between the said rack and the bearing lug, an operative connection between the saw supporting structure and said rack, and means to operate the rack to tilt the saw supporting structure to permit the saw to make an inclined cut, the center of the arcuate rack being substantially in alinement with the axial center of the arcuate guide bar.

22. A woodworking tool comprising in combination a vertical slide having an arcuate guide bar at its upper end, a table, means to attach said slide to the table at one end thereof, means to raise and lower said slide, a worm gear mounted on the slide, a worm to operate said gear, an operative connection through the table to operate the worm, a pedestal extending upwardly from the worm gear, an arcuate channel arm connected to said pedestal, an arcuate rack mounted on said channel arm, means extending through the table to operate said rack, a bearing lug operatively connected to the channel arm, said bearing lug resting on the horizontal arcuate guide bar, a block attached to the upper end of the arcuate rack, a bolt connected thereto, a block rotatably mounted on the said bolt, an arm extending upwardly from the said block, a box mounted at the upper end of said arm, a bar slidable through said box, a motor casing having a motor attached to the arm and a rotary saw operatively connected to the motor casing and driven by the motor.

23. A woodworking tool as claimed in claim 22, in which the axial center for rotation of the said gear and the arcuate rack are in alinement.

24. A woodworking tool as claimed in claim 22, in which the axial center of rotation of the said worm gear, the said arcuate rack and the axis of the said bolt are in alinement.

In testimony whereof I have signed my name to this specification.

CHARLES K. CARTER.